UNITED STATES PATENT OFFICE.

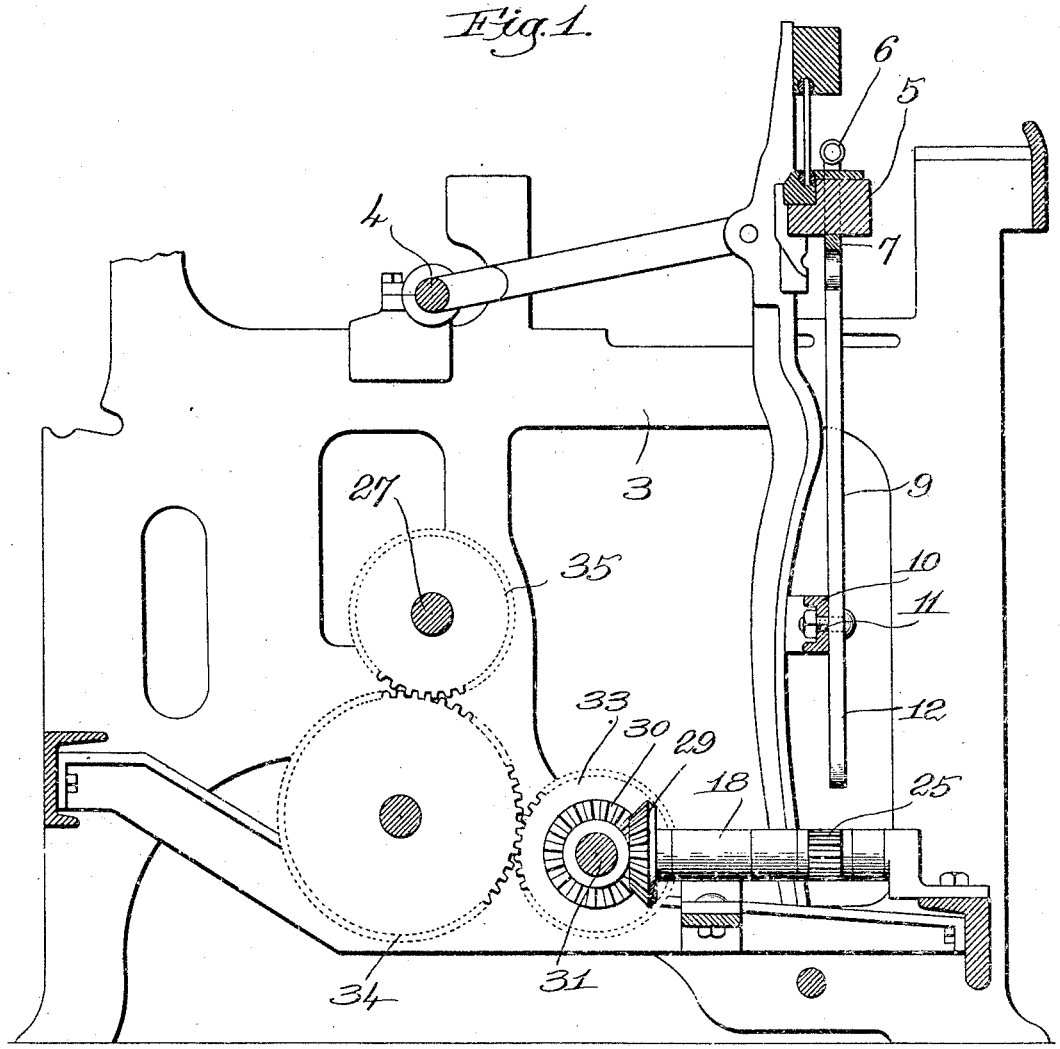

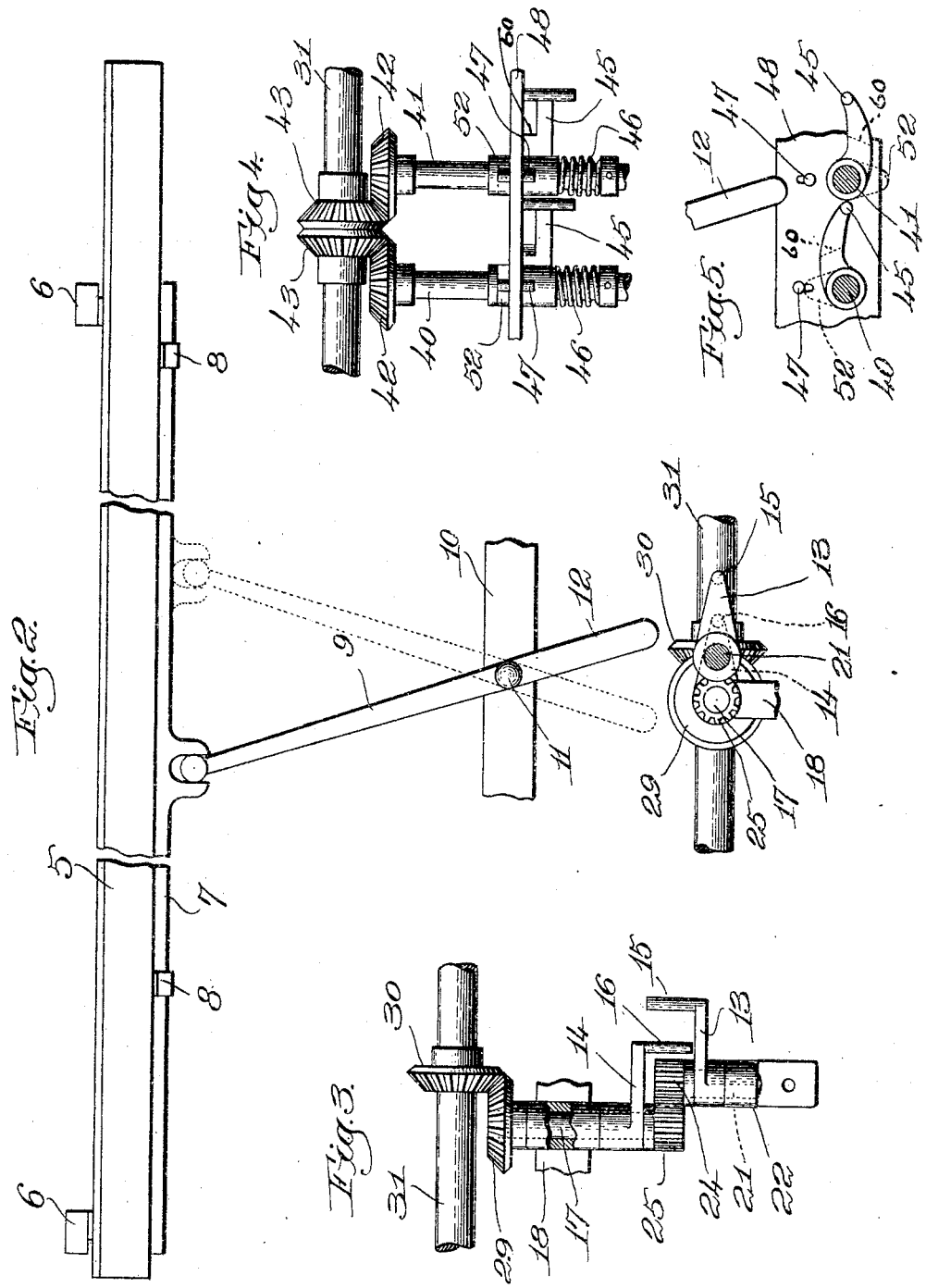

RENCELER C. SNOW, OF WARE, MASSACHUSETTS, ASSIGNOR, BY DIRECT AND MESNE ASSIGNMENTS, TO WARE MACHINE & LOOM COMPANY, OF WARE, MASSACHUSETTS, A CORPORATION OF MASSACHUSETTS.

LOOM.

959,174. Specification of Letters Patent. Patented May 24, 1910.

Application filed April 11, 1908. Serial No. 426,625.

*To all whom it may concern:*

Be it known that I, RENCELER C. SNOW, a citizen of the United States, residing at Ware, county of Hampshire, and State of Massachusetts, have invented an Improvement in Looms, of which the following description, in connection with the accompanying drawing, is a specification, like numerals on the drawing representing like parts.

This invention relates to looms and especially to the picking mechanism thereof, and has for its object to provide a novel picking mechanism, all as will be hereinafter described and then pointed out in the appended claims.

Referring now to the drawings wherein I have shown some embodiments of my invention, Figure 1 is a vertical sectional view of a loom showing one embodiment of the invention; Fig. 2 is a view showing the lay and the lever and cam mechanism for operating the pickers thereon; Fig. 3 is a plan view of the cam mechanism shown in Fig. 2; Figs. 4 and 5 show modifications of the invention.

3 designates the frame of a loom having thereon the crank shaft 4 from which the lay 5 is operated as usual. The lay is herein shown as having on each end thereof a picker 6 by means of which the shuttle is thrown across the lay. These pickers are both connected to a slide 7 which is situated beneath the lay and which operates in suitable bearings 8 carried by the lay. The slide 7 has pivotal connection with a slide-operating lever 9, which in turn is pivoted to a cross-bar or support 10 that extends from one lay-sword to the other. The pivotal point 11 of the said lever is between the ends thereof so that the lower end 12 of the lever projects below the pivotal point. For actuating the lever from the full to the dotted line position Fig. 2 for the purpose of moving the slide and actuating the pickers, I have provided a cam mechanism which is adapted to act on the lower end 12 of the lever.

A cam mechanism embodying my invention is shown in Figs. 1, 2 and 3, and it consists of two rotary arms 13 and 14 which rotate in opposite directions and which have their ends offset, as at 15 and 16 to engage the lower end 12 of the lever as the arms rotate. The arm 14 is shown as fast on a countershaft 17 which is mounted in suitable bearings 18 sustained by the loom frame, and the arm 13 is shown as fast to a shaft 21 which is journaled in suitable bearings 22 sustained by the loom frame. These shafts are out of line with each other, as shown in Fig. 3, and are geared together so that they rotate in opposite directions, the shaft 21 having thereon a gear 24 which meshes with a gear 25 on the shaft 17. These two shafts may be driven in any suitable way, but I prefer to drive them either from the cam shaft or from another shaft sustained by the loom which in turn is driven from the main shaft 27. As herein shown the shaft 17 has on one end thereof a bevel gear 29 which meshes with and is driven by a bevel gear 30 on a shaft 31 that extends across the loom. This shaft 31 may be the cam shaft of the loom on which are the cams for operating the harnesses, or may be a special shaft having for its purpose simply to drive the shaft 17. The shaft 31 is shown as being driven from the main shaft 27 by means of a gear 33 on said shaft 31 which meshes with and is driven by an idler 34 which in turn meshes with and is driven by a gear 35 on the shaft 27.

The tappet 15 is arranged to engage the lower end 12 of the lever 9 when the latter is in the full line position Fig. 2, and the tappet 16 carried by the arm 14 is arranged to engage said lower end of the lever when it is in the dotted line position Fig. 2. The gears 24 and 25 are of the same diameter so that the two shafts 17 and 21 rotate in unison although oppositely, and the arms 13 and 14 are so placed on the shafts that the tappets alternately engage the lower end of the lever 9 thereby swinging said lever from the full to the dotted line position and vice versa. By arranging the bearings 18 and 22 for the two shafts on opposite sides of the gears 24 and 25, said tappets can move around the shafts without interfering either with each other or with the bearings.

In Figs. 4 and 5 I have shown an embodiment of the invention in which the tappets are arranged to strike the lever a quicker and sharper blow than is given by the mechanism shown in Figs. 1 to 3. This is done by loosely mounting the tappets upon the shafts supporting them and connecting the tappets to the shafts by springs and then by retarding the movement of each tappet just prior to its engagement with the lever until the spring associated therewith is placed under tension, and then releasing the tappet so that it will give the lever a quick blow due to the action of the spring in addition to the rotating action of the shaft. In the embodiment referred to, the two tappets are mounted on separate shafts 40 and 41, each of which has thereon a bevel gear 42 that meshes with a bevel gear 43 on the shaft 31. Loosely mounted on each shaft is a tappet or cam 45 which is connected to the shaft by means of a spring 46. Each tappet is formed with a shoulder 60 and has associated therewith a stop 47 which is slidably sustained by a cross-piece 48 that may conveniently be supported either by the shafts or by the loom frame. Each stop is so positioned that the shoulder of the corresponding tappet will engage it just before said tappet is in position to strike the lower end 12 of the lever 9. When the shoulder of the tappet does thus engage the stop, further rotation of the shaft will put the spring 46 under tension and when the spring has been thus placed under tension the stop 47 is removed from the path of the shoulder 60 thereby permitting the spring to throw the tappet forward and strike the lever with a quick blow. The necessary movement of the stops may be secured in various ways, but I have herein shown each stop as having an extension which projects beyond the cross bar 48 and is adapted to be engaged by a cam 52 fast on the shaft carrying the tappet so that when the movement of the tappet is arrested by the stop, the continued forward movement of the shaft brings the cam 52 under the projection, elevates the stop 47 and thus releases the tappet. This same construction is employed with both the tappets.

In both forms of my invention it will be noted that both tappets operate on the end of the actuating lever which in turn is pivoted between its ends.

I have not attempted to illustrate herein all forms of my invention, but have merely shown two of the preferred forms.

Having fully described my invention, what I claim as new and desire to secure by Letters Patent is—

1. In a loom, the combination with a lay, of two pickers thereon, a bar connecting said pickers, an actuating lever pivoted at a point between its ends and operatively connected to said bar, and two oppositely-rotating tappets to engage the lower end of the lever and actuate it first in one direction and then the other.

2. In a loom, the combination with a lay, of two pickers thereon, a bar connecting said pickers, an actuating lever pivoted at a point between its ends and operatively connected to said bar, and two oppositely-rotating shafts and a tappet on each shaft to engage the lower end of the lever and actuate it.

In testimony whereof, I have signed my name to this specification, in the presence of two subscribing witnesses.

RENCELER C. SNOW.

Witnesses:
Louis C. Smith,
Henry Côte.